US012053865B2

(12) United States Patent
Walker et al.

(10) Patent No.: US 12,053,865 B2
(45) Date of Patent: Aug. 6, 2024

(54) CLAMP RELEASE TOOL AND METHOD

(71) Applicant: Integrated Display Systems Limited, Newcastle upon Tyne (GB)

(72) Inventors: Matthew Walker, Newcastle upon Tyne (GB); Pavlos Sgardelis, Newcastle upon Tyne (GB)

(73) Assignee: Integrated Display Systems Limited, Newcastle upon Tyne (GB)

( * ) Notice: Subject to any disclaimer, the term of this patent is extended or adjusted under 35 U.S.C. 154(b) by 454 days.

(21) Appl. No.: 17/442,887

(22) PCT Filed: Mar. 26, 2020

(86) PCT No.: PCT/GB2020/050814
§ 371 (c)(1),
(2) Date: Sep. 24, 2021

(87) PCT Pub. No.: WO2020/201723
PCT Pub. Date: Oct. 8, 2020

(65) Prior Publication Data
US 2022/0161400 A1 May 26, 2022

(30) Foreign Application Priority Data

Apr. 2, 2019 (GR) .............................. 20190100154

(51) Int. Cl.
*B25B 25/00* (2006.01)
*F16L 33/02* (2006.01)
*G01P 1/12* (2006.01)

(52) U.S. Cl.
CPC .......... *B25B 25/005* (2013.01); *F16L 33/021* (2013.01); *G01P 1/127* (2013.01)

(58) Field of Classification Search
CPC ..... B25B 25/005; F16L 33/021; G01N 29/12; G01P 1/127
See application file for complete search history.

(56) References Cited

U.S. PATENT DOCUMENTS 6,981,432 B2 * 1/2006 Williford .............. B25B 25/005
140/93.2
7,900,524 B2 † 3/2011 Calloway
(Continued)

FOREIGN PATENT DOCUMENTS

| JP | 2005231001 | † | 9/2005 |
| JP | 2011152606 A | | 8/2011 |
| SE | 543978 C2 | † | 10/2021 |

OTHER PUBLICATIONS

International Searching Authority, "International Search Report and Written Opinion from PCT Application No. PCT/GB2020/050814", Jun. 23, 2020, pp. 1 through 11, Published: WO.
(Continued)

*Primary Examiner* — An H Do
(74) *Attorney, Agent, or Firm* — Fogg & Powers LLC (57) ABSTRACT

A method of operating a pre-opened pre-positioned clamp, the clamp being operable between an open and a closed position. The method comprises releasing the clamp from the open position using a tool head (201), making measurements of a movement of the tool head resulting from the releasing, recording data relating to the measurements, determining a frequency content of the data, and, on the basis of the determined frequency content, determining whether the clamp has moved to the closed position.

20 Claims, 5 Drawing Sheets

(56) References Cited

U.S. PATENT DOCUMENTS

| | | | |
|---|---|---|---|
| 9,869,406 | B1 | 1/2018 | Shields |
| 10,718,442 | B1 † | 7/2020 | Fatehi |
| 2005/0262969 | A1 | 12/2005 | Panyard et al. |
| 2010/0058901 | A1 | 3/2010 | Calloway et al. |
| 2018/0318991 | A1 † | 11/2018 | Cigada et al. |
| 2019/0183589 | A1 * | 6/2019 | Cappadona ............ A61B 90/14 |

OTHER PUBLICATIONS

Clavis, "GUSTO (POPP Clamp Release) Tool", webpage <http://www.clavis.co.uk:80/gusto_tool.html>, pp. 1 through 3, Dec. 30, 2018, retrieved from Internet Archive Wayback Machine <https://web.archive.org/web/20181230162247/http://www.clavis.co.uk:80/gusto_tool.html> on Feb. 3, 2023.

European Patent Office, "Communication pursuant to Rule 114(2) EPC", from EP Application No. 20721680.5, from Foreign Counterpart to U.S. Appl. No. 17/442,887, filed Feb. 21, 2023, pp. 1 through 6, Published: EP.

Japanese Patent Office, "Office Action", from JP Application No. 2021-560500, from Foreign Counterpart to U.S. Appl. No. 17/442,887, filed Apr. 24, 2024, pp. 1 through 14, Published: JP.

The Queen's Awards for Enterprise, the Queen's Awards for Enterprise 2016 Press book, Apr. 21, 2016, 111 pages.†

The Queen's Awards for Enterprise, the Queen's Awards for Enterprise: Criteria for Entering the Awards, the 2016 Queen's Awards Enterprise Magazine, Jun. 24, 2016,p. 10, www.queensawardsmagazine.com.†

Analog Devices, Inc., MEMS Inertial Measurement Units for Complex Motion Capture and Processing, 2013, pp. 1-4, www.analog.com.†

\* cited by examiner
† cited by third party

CLAMP RELEASE TOOL AND METHOD

CROSS-REFERENCE TO RELATED APPLICATIONS

This application is a U.S. 371 National Stage patent application claiming priority to, and the benefit of International Patent Application No. PCT/GB2020/050814 filed on Mar. 26, 2020, which claims priority to Greece Patent Application No. 20190100154 filed on Apr. 2, 2019, which are incorporated herein by reference.

FIELD OF THE INVENTION

The present invention concerns a method of operating a pre-opened clamp. More particularly, but not exclusively, this invention concerns a method of operating a Pre-Opened Pre-Positioned (POPP) clamp, which may for example be in the form of a clipless pre-opened spring band clamp.

BACKGROUND OF THE INVENTION

In many fields, flexible pipes are used to transfer fluids. Examples of products that use such pipes include washing machines and automobiles. In automotive engines, for example, coolant is transported to a radiator via rubber hoses. The hoses are attached to spigots, such as fluid inlets and outlets, and are secured in place by appropriate clamps, such as Pre-Opened Pre-Positioned clamps (often referred to simply as "POPP clamps).

Figure 1:
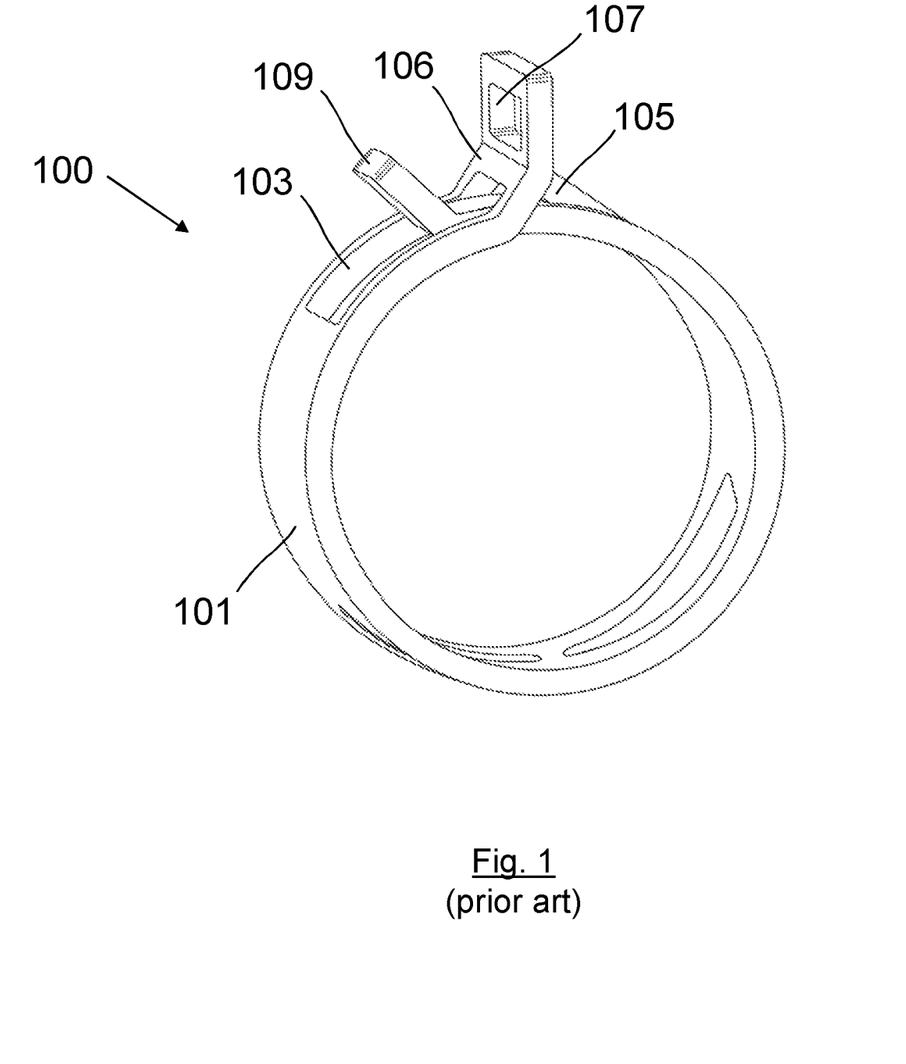
FIG. 1 shows a perspective view of a typical pre-opened pre-positioned clamp of the prior art.

FIG. 1 shows an exemplary POPP clamp 100 of the prior art. The clamp 100 comprises a substantially circular curved band 101. A first end of the band 101 comprises a cut-out 103, shaped to accommodate a second end of the band 101. The band 101 can be pried open, such that it has a larger diameter, whilst maintaining its substantially circular shape. Opening the band 101 places it under tension, such that, when released, the band 101 contracts back to its original diameter. The second end of the band 101 comprises a protrusion 105 that, on opening the band sufficiently, serves to secure the band 101 in an open position. FIG. 1 shows the clamp 100 secured in such an open position. The band is under tension, but is prevented from closing by means of the protrusion 105 being urged against a stop 106 at the first end of the band. To release the clamp 100 from the open position, a clamp release tool is inserted into a recess 107 of band 101 and manipulated such that the clamp release tool pushes down onto a prong 109 of the clamp 101. This action urges the protrusion 105 down and away from the stop 106, until the protrusion 105 is able to pass through the cut-out 103, allowing the band 101 to contract to a smaller diameter. The POPP clamp 100 is therefore operable between an open position and a closed position.

A POPP clamp is fitted by being placed in the open position, brought into position around a hose fitted on a spigot, and released from the open position. The POPP clamp then contracts until it meets the hose, clamping the hose to the spigot. The POPP clamp can then be said to be in a closed position. A release of a POPP clamp which results in the clamp moving to the closed position can be said to be a successful release of the clamp.

POPP clamps do not always release from the open position successfully. For example, protrusion 105 may move from its resting position but does not move through cut-out 103. In such a situation, clamp 100 does not move to the closed position and therefore does not apply a clamping force to the hose.

On an automotive production line, an operator fits POPP clamps manually, using a handheld clamp release tool. It is not always immediately apparent to an operator whether a POPP clamp has released successfully. Operators may therefore be unaware that a POPP clamp has not released successfully, and is therefore not providing a clamping force to the hose. This can waste the operator's time by requiring them to check their clamps, and any unsuccessfully released clamps that go unnoticed can ultimately result in a leak at the inadequately clamped pipe-spigot joint. In the case of an automotive engine coolant system, a leak may result in a loss of coolant fluid, which can lead to engine damage and failure.

Production lines, and particularly automotive production lines, also require traceability of actions performed on the production line for quality control purposes. In order to fulfil this requirement, an operator may need to record each clamp they release. This is typically a slow and manual process, which is a further drain on the operator's time.

The present invention seeks to mitigate one or more of the above-mentioned problems. Alternatively or additionally, the present invention seeks to provide an improved tool for, and/or an improved method of, operating a pre-opened pre-positioned clamp.

SUMMARY OF THE INVENTION

The present invention provides, according to a first aspect, a method of operating a pre-opened pre-positioned clamp, the clamp being operable between an open and a closed position. The method comprises releasing the clamp from the open position using a tool head. Data resulting from measurements of a movement of the tool head resulting from the releasing are recorded. The method comprises determining a frequency content of the data; and, on the basis of the determined frequency content, determining whether the clamp has moved to the closed position.

Embodiments of the invention using the above method can provide more reliable detection of whether a clamp has been successfully released. The inventors believe for example that embodiments of the invention provide more reliable detection of whether a clamp has been successfully released than a comparable method in which only data relating directly to the absolute position and speed of the tool are used to determine successful release of the clamp. Embodiments of the invention can also provide a "smart" clamp release tool, which allows automatic recording of a clamp release to fulfil the traceability requirements of a, for example automotive, production line.

Making measurements of a movement may comprise measuring relative motion in at least three different directions in 3-D space. Making measurements of a movement may comprise measuring relative rotation about at least three different axes in 3-D space. Making measurements of a movement may comprise measuring movement in respect of all three planes of motion. Making measurements of a movement may comprise measuring rotation in respect of pitch, roll, and yaw. Making measurements of a movement may comprises measuring forces or the like, rather than the change in absolute positon in 3D space. The movement may comprise vibration, for example at a frequency of greater than 100 Hz.

When successfully released, a POPP clamp vibrates with a characteristic frequency. Embodiments of the invention can therefore determine whether a POPP clamp has released successfully by measuring vibration of the tool head.

The frequency content may comprise content concerning one or more frequencies that are characteristic of the clamp having moved to the closed position.

Embodiments of the invention that detect content concerning one or more frequencies that are characteristic of the clamp having moved to the closed position can determine whether a detected movement corresponds to a successful POPP clamp release.

The method may further comprise, on the basis of the measured movement, determining that a trigger event has occurred. Determining that such a trigger event has occurred may comprise detection of one or more significant oscillations. A significant oscillation may be deemed as one comprising an acceleration of more than a threshold, the threshold for example being greater than 100 ms$^{-2}$. The threshold may be greater than 500 ms$^{-2}$. The threshold may be greater than 900 ms$^{-2}$. The threshold may be about 1000 ms$^{-2}$ or more (i.e. at least ~100 g). A significant oscillation may alternatively, or additionally, be deemed as one comprising a rate of change of acceleration (absolute magnitude value) of more than a threshold, the threshold for example being greater than 500 ms$^{-3}$. The threshold may be greater than 900 ms$^{-3}$. Determining that a trigger event has occurred may comprise detection of at least three (for example four, or optionally more, consecutive significant oscillations). The recording (of data resulting from measurements of the movement of the tool head) may be performed in response to the trigger event.

Embodiments of the invention that act on the basis of a detected trigger event can enable a clamp release tool to reduce a power consumption of the tool, and thereby extend a battery life of the tool, by entering a low-power mode until detection of the trigger event.

The recorded data may comprise data defining movement preceding the trigger event and data defining movement following the trigger event.

Embodiments of the invention that evaluate data that both immediately precede and follow the trigger event can enable a more accurate determination of whether a measured movement corresponds to a successful release of a POPP clamp.

As mentioned above, the method comprises determining a frequency content of the data; and, on the basis of the determined frequency content, determining whether the clamp has moved to the closed position. Determining the frequency content may comprise performing a Fourier transform. Determining whether the clamp has moved to a closed position may comprise determining the frequency of the maximum peak in the frequency content and/or the frequency band having the maximum magnitude (which may be referred to as the dominant frequency and/or dominant frequency band). Determining whether the clamp has moved to a closed position may comprise determining the magnitude of the frequency component at the dominant frequency/ dominant frequency band. Determining whether the clamp has moved to a closed position may additionally or alternatively comprise determining the frequency and/or magnitude of one or more peaks in the frequency content, other than the maximum peak. Determining whether the clamp has moved to a closed position may comprise evaluating the rate of change of frequency content (in the frequency domain). Determining whether the clamp has moved to the closed position may comprise evaluating the ratio of the magnitude of one frequency component (or frequency band) and another. Determining whether the clamp has moved to the closed position may comprise evaluating multiple such ratios, for example ten or more, for different pairs of frequency bands. It may be that at least one frequency component (or frequency band) used to calculate a ratio is the magnitude of the dominant frequency. It may be that at least one frequency component (or frequency band) used to calculate a ratio is the magnitude of the second highest dominant frequency and/or the second highest dominant frequency. It may be that at least one frequency component (or frequency band) used to calculate a ratio is the average magnitude (whether mode, median or mean) in the frequency domain. The kurtosis and/or skewness of the frequency content may be used in determining whether the clamp has moved to the closed position.

Determining whether the clamp has moved to the closed position may include the use of other parameters, in addition to those relating to the frequency content.

Determining whether the clamp has moved to a closed position may comprise determining a change in orientation of the clamp release tool. The orientation may be relative to a starting position and/or a position at a given moment, for example the position at the trigger event.

Determining whether the clamp has moved to a closed position may comprise evaluating the correlation between at least one of (a) a first set of data representative of, or derived from, rotational speed about a first axis over a given time period and a second set of data, for example, representative of, or derived from, rotational speed about a second axis different from the first, for example over the same time period and (b) a first set of data representative of, or derived from, translational acceleration in a first direction over a given time period and a second set of data, for example, representative of, or derived from, translational acceleration in a second direction different from the first, for example over the same time period. Determining whether the clamp has moved to a closed position may comprise evaluating a Pearson's correlation coefficient of the recorded data. Determining whether the clamp has moved to a closed position may comprise evaluating whether data representative of, or derived from, pitch rotation measurements meet certain criteria. Determining whether the clamp has moved to a closed position may comprise evaluating a mathematical measure of the diversity of the recorded data (for example the Shannon-Wiener diversity index of the data), and preferably of data representative of, or derived from, pitch rotation measurements. Determining whether the clamp has moved to a closed position may comprise evaluating a kurtosis of the recorded data (or data derived from the recorded data). Determining whether the clamp has moved to a closed position may comprise evaluating a skewness of the recorded data. In each such case the recorded data may comprise at least one of (a) data representative of, or derived from, rotational speed about at least one, and preferably three different axes, and (b) data representative of, or derived from, translational acceleration in one direction, and preferably three different directions.

Determining whether the clamp has moved to a closed position may comprise one or more of calculating the number of significant oscillations, calculating the maximum or average gradient of the slope of the curve(s) representing in the time-position domain one or more significant oscillations, calculating a rate of change of acceleration (in one or more directions), using the maximum acceleration (in one or more directions), using the minimum value acceleration (in one or more directions), using the average (e.g. mean value, modal value, or median value) of the acceleration (in one or more directions) and first and/or third quartile value of the acceleration (in one or more directions).

Determining whether the clamp has moved to a closed position may comprise calculating a plurality of parameters from the recorded data. Determining whether the clamp has moved to a closed position may comprise using those parameters to evaluate whether the clamp has moved to a closed position. The plurality of parameters may comprise three or more different parameters. Each of the three or more different parameters may relate to one of the ways described herein of determining whether the clamp has moved to a closed position. The plurality of parameters may comprise two or more (preferably three or more) different parameters from a group consisting of: a measure of correlation, Pearson's correlation coefficient, a measure of diversity, Shannon-Wiener diversity index, a count of significant oscillations, an average rate of change of the significant oscillations, a rate of change of the data, kurtosis, skewness, a maximum value of the data, a minimum value of the data, a mean value of the data, a median value of the data, a modal value of the data, a first quartile value of the data, and a third quartile value of the data. As above, in each such case the recorded data may comprise at least one of (a) data representative of, or derived from, rotational speed about at least one, and preferably three different axes, and (b) data representative of, or derived from, translational acceleration in one direction, and preferably three different directions.

Embodiments of the invention that evaluate three or more of the various parameters mentioned above can provide more reliable detection of a successful clamp release.

Determining whether the clamp has moved to a closed position may comprise applying one or more rules. The one or more rules may define the characteristics of a movement deemed to be one corresponding to the clamp moving to the closed position. The one or more rules may be based on the output of a classification tree. The one or more rules may be based on the output of a plurality of classification trees. The one or more rules may be based on the output of a majority vote by the plurality of classification trees. The classification tree may operate on the basis of a plurality of weights, the plurality of weights being determined by a machine learning algorithm.

It may be the case that the problem of reliably determining whether a detected movement corresponds to a successful release of a clamp is intractable, with a large number of uncontrollable variables. Embodiments of the invention in which a machine learning algorithm is used to determine the plurality of weights can provide a more reliable method to determine whether a detected movement corresponds to a successful release of a clamp. Such embodiments can also enable a clamp release tool to continue to develop though ongoing training of the machine learning algorithm using data acquired by a deployed clamp release tool. Embodiments of the invention in which the one or more rules are based on the output of a plurality of classification trees can reduce the likelihood of the machine learning algorithm generating an over-fitted solution.

Determining whether the clamp has moved to the closed position may comprise evaluating the output of a sliding window algorithm. The sliding window algorithm may comprise calculating a ratio of an amplitude of a first frequency band to an amplitude of a second frequency band. The sliding window algorithm may comprise calculating at least 10 ratios. The one or more rules may operate based on the outputs of the sliding window algorithm.

It may be that the step of determining whether the clamp has moved to the closed position is deemed as being equivalent to determining whether the clamp has been successfully released. Determining whether the clamp has moved to the closed position may comprise a positive detection of a movement corresponding to the clamp moving to the closed position. In embodiments of the invention, this means not simply detecting characteristics corresponding to a faulty operation, and in the absence of such a detection deeming the operation of the POPP clamp to have been successful, but positively requiring detecting characteristics corresponding to a successful operation of the POPP clamp. The method may for example include a step of determining that the clamp has moved to the closed position and that step may comprise positively determining that the clamp has been successfully released. Embodiments of the invention that perform such a positive detection of a movement corresponding to the clamp moving to the closed position may provide a reduced false positive rate.

Making measurements may comprise measuring movement at a sample rate of greater than 3 kHz for each direction and about each axis. The sample rate may be greater than 4.5 kHz. The sample rate may be greater than 6 kHz.

Embodiments of the invention with a sample rate of greater than 3 kHz can enable the clamp release tool to capture the full extent of the characteristic frequencies of a successful clamp release. Embodiments of the invention with higher sample rates can capture a greater range of frequencies, enabling a more reliable determination of whether a measured movement corresponds to successful release of a clamp.

According to a second aspect of the invention there is also provided a clamp attachment tool for operating a pre-opened pre-positioned clamp, the clamp being operable between an open position and a closed position. The tool comprises a tool head for releasing a clamp from the open position; inertial measurement electronics arranged to make measurements of a movement of the tool head; and signal processing electronics. The signal processing electronics are configured to determine a frequency content of the detected movement and, on the basis of the determined frequency content, determine whether the clamp has moved to the closed position.

The clamp may be suitable for clamping a hose, preferably an automotive hose, to a spigot. The spigot may comprise a fluid inlet or outlet.

The clamp in the open position may be held at an expanded diameter, greater than an external diameter of the hose. The clamp in the closed position may be positioned around the hose and the diameter of the clamp may be substantially the same as the external diameter of the hose. The clamp may be resiliently deformable, such that the clamp in the closed position exerts a compressive force on the hose, clamping the hose to the spigot.

The clamp attachment tool may be suitable for clamps with an internal diameter, when in the closed position, of between 14 mm and 43 mm.

The clamp attachment tool may be portable. The clamp attachment tool may be hand-held.

The tool head may be configured to be removable from the clamp attachment tool. Tool heads suffer wear and damage in use and, after a period of time, must be replaced. A clamp attachment tool with a removable tool head allows the replacement of worn tool heads without requiring that the entire clamp attachment tool be replaced. Thus, it may be that the tool head is arranged to be replaced separately to the rest of the clamp attachment tool. The inertial measurement electronics (and optionally also the signal processing electronics) may be located in a body of the clamp attachment tool, such that the tool head can be removed and replaced without requiring replacement of the inertial measurement electronics and signal processing electronics. Thus, the inertial measurement electronics and the signal processing electronics may be located apart from the tool head. It may be that the inertial measurement electronics and signal processing electronics are not located in or on the tool head. Additionally, it may be that the inertial measurement electronics and signal processing electronics are not permanently attached to the tool head. The body of the clamp attachment tool and the means for attaching the tool head to the body of the clamp attachment tool may be configured to convey a movement of the tool head (for example vibration of the tool head) to the inertial measurement electronics. Thus, it may be that the body of the clamp attachment tool and the means for attaching the tool head to the body of the clamp attachment tool are configured such that a movement of the tool head causes a corresponding movement at the inertial measurement electronics.

According to a third aspect of the invention there is also provided a method of manufacturing a clamp attachment tool. The tool may be one according to the second aspect of the invention and/or one suitable for performing the method of the first aspect of the invention. For example, the tool may be suitable for operating a pre-opened pre-positioned clamp, the tool comprising a tool head arranged to engage with the clamp and inertial measurement electronics arranged to take measurements of a movement of the tool head, the clamp being operable between an open position and a closed position. The method comprises programming signal processing electronics, which are arranged in use to receive a signal corresponding to the measurements made by the tool, to record data relating to the measurements, determine a frequency content of the data and, on the basis of the determined frequency content, determine whether the clamp has moved to the closed position.

The method may comprise determining one or more rules for classifying a detected movement as either corresponding to the clamp having moved to the closed position or as not. The one or more rules may define the characteristics of a movement deemed to be one corresponding to the clamp moving to the closed position. Determining whether the clamp has moved to the closed position may comprises applying the one or more rules.

The method may comprise operating a machine learning algorithm to determine the one or more rules.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 2:
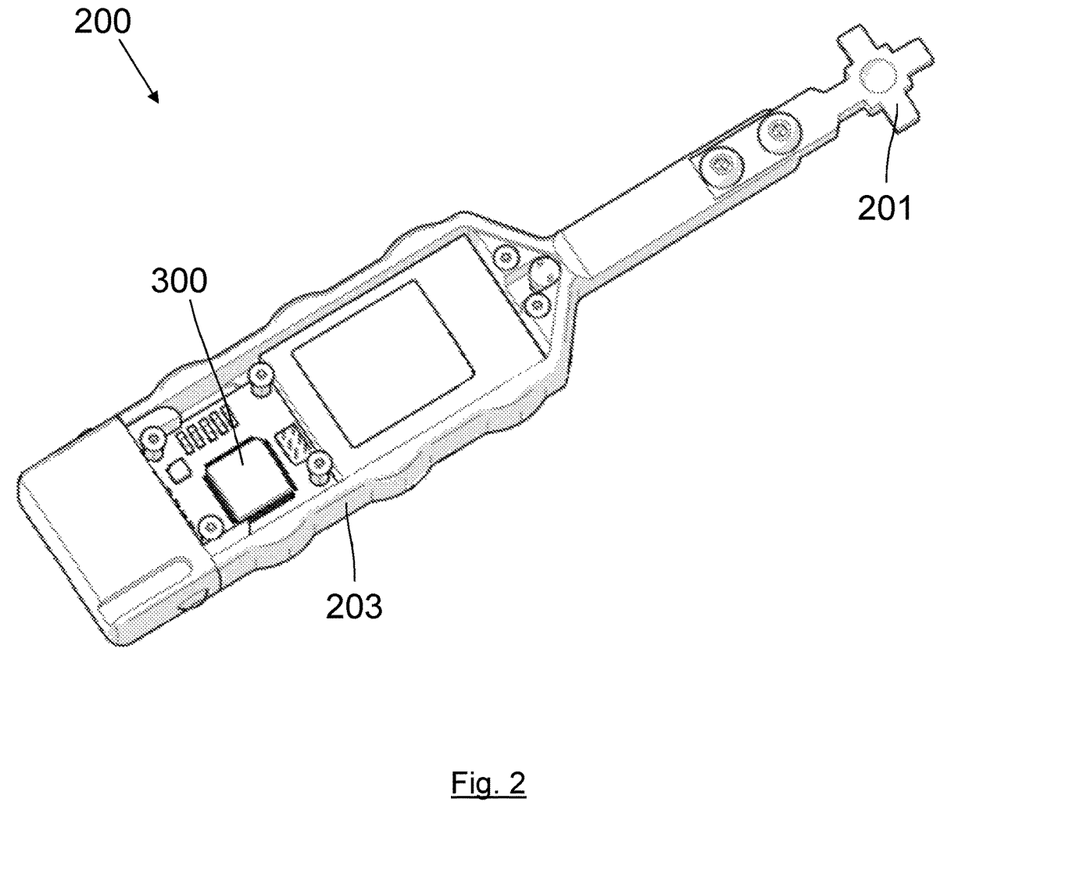
FIG. 2 shows a perspective view of a clamp release tool according to a first embodiment of the invention.

FIG. 2 shows a perspective view of a Pre-Opened Pre-Positioned (POPP) clamp release tool 200 according to a first embodiment of the invention.

Clamp release tool 200 comprises a tool head 201 and a handle 203. Tool head 201 comprises three prongs, each of which is arranged to be received in recess 107 of POPP clamp 100 such that tool head 201 is suitable for releasing a POPP clamp 100 from the open position. Alternative embodiments of the invention may comprise a different number of prongs such as one or two prongs, or possible more prongs. Incorporating the three prongs enables clamp release tool 200 to be engage with clamp 100 from three different angles, providing an operator of clamp release tool 200 a number of potential angles for using the tool. This is particularly beneficial when clamps are used in confined spaces, as is often the case for automotive applications. Clamp release tool 200 further comprises an electronics package 300 contained within handle 203.

Figure 3:
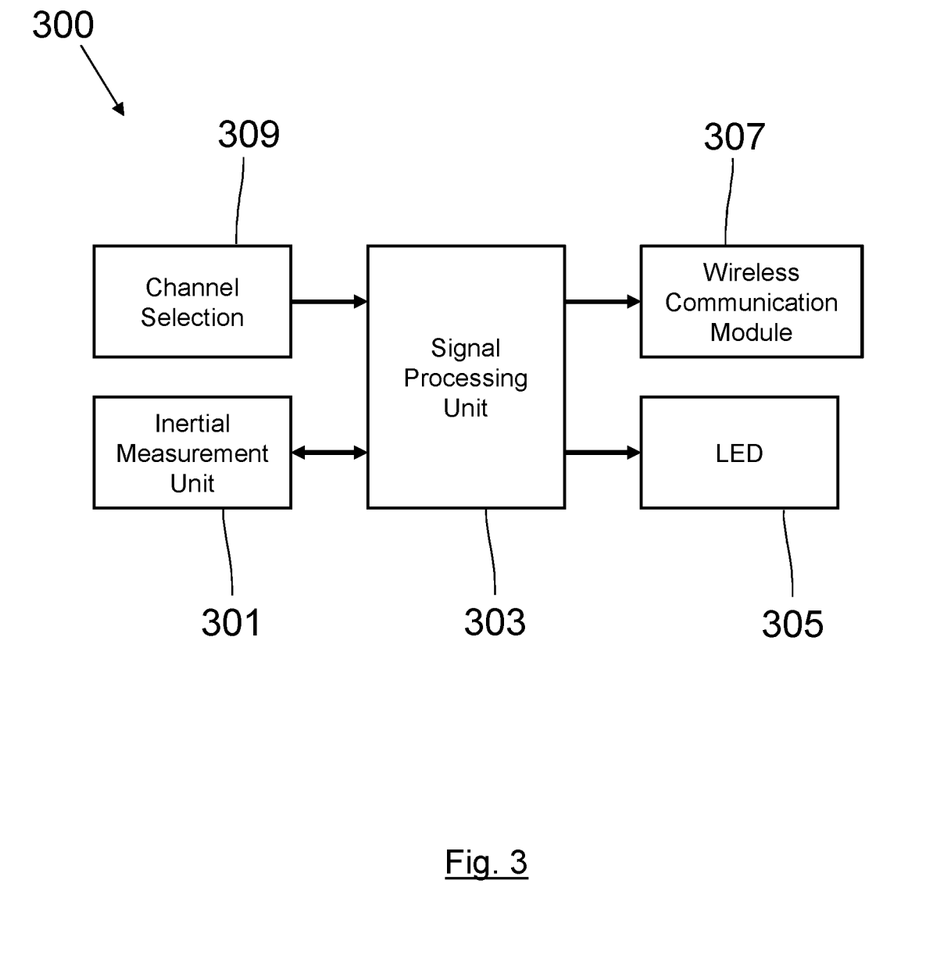
FIG. 3 shows a block diagram of an electronics package of a clamp release tool of FIG. 2.

FIG. 3 shows a block diagram of electronics package 300. Electronics package 300 comprises an inertial measurement unit 301 and is mounted to tool head 201 such that a movement of tool head 201 results in a corresponding movement of electronics package 300, and therefore of inertial measurement unit 301.

Inertial measurement unit 301 comprises three accelerometers and three gyroscopes, arranged such that inertial measurement unit 301 can detect movement, and particularly vibration, in respect of all three planes of motion and in respect of pitch, roll, and yaw. Inertial measurement unit 301 can therefore be said to comprise a six-axis gyroscope. Alternative embodiments of the invention may comprise fewer (i.e. one or two) accelerometers and/or fewer (i.e. one or two) gyroscopes. Inertial measurement unit 301 is configured to transmit a signal corresponding to the detected movement to a signal processing unit 303 of electronics package 300. The signal from inertial measurement unit 301 can be said to comprise inertial data of inertial measurement unit 301. In this exemplary embodiment, inertial measurement unit 301 detects movement and generates a full set of inertial data, comprising data from each of the accelerometers and gyroscopes, at a rate of 6.667 kHz. The inertial data therefore comprises data defining an acceleration of each of the accelerometers in the respective directions of detection and data defining an angular rate of each of the gyroscopes about their respective axes of detection (speed of rotation about each such axis—i.e. angular velocity).

Signal processing unit 303 is configured to process the inertial data to determine whether a detected movement corresponds to the successful release of a POPP clamp. To do so, signal processing unit 303 is configured to monitor the inertial data for a trigger event. The trigger event comprises a movement containing at least four significant oscillations, wherein a significant oscillation is one that corresponds to a rate of change in acceleration in excess of 100 gs$^{-1}$ (i.e. 980 ms$^{-3}$). The monitoring therefore comprises checking the inertial data for four consecutive oscillations which meet the following criteria:

$$\text{Abs}(ACX[i]-ACX[i-1])>0.147 \text{ ms}^{-2} \quad (1)$$

Where:
ACX=acceleration in the x-direction.

Signal processing unit 303 is further configured to, in response to detection of the trigger event, log inertial data corresponding to 0.45 seconds of time. Specifically, signal processing unit 303 is configured to log inertial data for the 0.27 seconds immediately preceding the trigger event (pre-trigger inertial data) and for the 0.18 seconds immediately following the trigger event (post-trigger inertial data). In this exemplary embodiment, inertial data is acquired at a rate of 6.667 kHz, therefore the preceding 0.27 seconds corresponds to 1800 logged data points and the following 0.18 seconds corresponds to 1200 logged data points. The signal processing unit therefore logs six arrays, each of 3000 data points, and corresponding to one array for each of the three accelerometers and three gyroscopes.

Signal processing unit 303 is further configured to calculate, on the basis of the logged inertial data, a change in orientation of clamp release tool 200. This is calculated by use of the following equations:

$$RollGY[j] = \int_{i=0}^{i=j} GYX \, dt = \sum_{i=0}^{i=j} \frac{GYX(i)}{dt} \quad (2)$$

$$PitchGY[j] = \int_{i=0}^{i=j} GYY \, dt = \sum_{i=0}^{i=j} \frac{GYY(i)}{dt} \quad (3)$$

$$Yaw[j] = \int_{i=0}^{i=j} GYZ \, dt = \sum_{i=0}^{i=j} \frac{GYZ(i)}{dt} \quad (4)$$

$$RollAC[j] = \tan^{-1}\left(\frac{ACX[j]}{ACZ[j]}\right) \quad (5)$$

$$PitchAC[j] = \tan^{-1}\left(\frac{ACY[j]}{\sqrt{ACZ[j]^2 + ACZ[j]^2}}\right) \quad (6)$$

Where:
RollGY=roll as determined from the integral of the gyroscope data;
PitchGY=pitch as determined from the integral of the gyroscope data;
Yaw=yaw as determined from the integral of the gyroscope data;
GYX=gyroscope data for rotation about the x-axis;
GYY=gyroscope data for rotation about the y-axis;
GYZ=gyroscope data for rotation about the z-axis;
RollAC=roll as determined from the accelerometer data;
PitchAC=pitch as determined from the accelerometer data;
ACX=accelerometer data for acceleration in the x-direction;
ACY=accelerometer data for acceleration in the y-direction; and
ACZ=accelerometer data for acceleration in the z-direction.

A data fusion algorithm is used to provide estimates of roll and pitch, as the results of the integration of GYX and GYY are liable to drift over time. The final estimates of roll and pitch are therefore calculated by use of the following equations:

$$Roll[j]=0.82*RollGY[j]+0.18*RollAC[j] \quad (7)$$

$$Pitch[j]=0.82*PitchGY[j]+0.18*PitchAC[j] \quad (8)$$

Where:
Roll=roll as determined from the data fusion; and
Pitch=pitch as determined from the data fusion.

The change in orientation of clamp release tool 200 comprises a factor that may be evaluated in determining whether a detected movement corresponds to a successful release of a POP clamp.

Signal processing unit 303 is further configured to determine the frequency content of the logged inertial data. Determining the frequency content comprises performing a Fourier transform on the logged inertial data, for example a Discrete Fourier Transform (DFT) or a Fast Fourier Transform (FFT). The Fourier transform is performed on the 128 data points following the trigger event, for each of the accelerometers and gyroscopes.

Releasing a POPP clamp induces a vibration in the clamp release tool. A successfully released POPP clamp induces vibrations with a specific characteristic frequency distribution, comprising a single dominant frequency and a number of harmonic frequencies. This specific frequency distribution is therefore characteristic of the clamp having moved to the closed position, and is indicative that the clamp has been successfully released. The frequency distribution may comprise frequency components relating to a movement of protrusion 105 of clamp 100. The frequency distribution may comprise frequency components relating to a vibration of prong 109 of clamp 100. POPP clamps come in a range of sizes, each of which vibrates with a different characteristic frequency distribution. There are therefore a number of different characteristic frequency distributions that can indicate the successful release of a POPP clamp.

The frequency content is processed by use of a sliding window algorithm. The data is first grouped into a finite number, for example 64, of bins. In this exemplary embodiment, each bin corresponds to a 52 Hz frequency range. Two windows, each of which are four bins wide in this exemplary embodiment, are then applied to the data, with the first window comprising the first four bins and the second windows comprising the second four bins. The mean of the first window is divided by the mean of the second window and the result stored. The second window is then advanced by one bin, such that it now comprises the fifth to ninth bins, and the process is repeated. Once the second bin has reached the final four bins, the first window is advanced by one bin, such that it now comprises the second to fifth bins, and the second window is moved to comprise the four bins following the first window. This process is repeated until both windows reach the end of the data set. The output of this algorithm (the DFT sliding window algorithm data) comprises a factor that may be evaluated in determining whether a detected movement corresponds to a successful release of a POPP clamp.

The particular frequency bin that corresponds to the maximum peak in the frequency content also comprises a factor that may be evaluated in determining whether a detected movement corresponds to a successful release of a POPP clamp.

Signal processing unit 303 is further configured to determine one or more quantities related to the arrays of logged inertial data.

A first exemplary quantity comprises the Pearson Correlation Coefficient (PCC). Signal processing unit 303 is configured to calculate the PCC of pairs of the arrays of pre-trigger inertial data. PCC provides a measure of the correlation of the two sets of data, where a PCC of +1 indicates total positive linear correlation, 0 indicates no correlation, and −1 indicates total negative correlation. The PCC of arrays X and Y are calculated by use of the following equation:

$$PCC = \frac{n\sum_0^n XY - \left(\sum_0^n X * \sum_0^n Y\right)}{\sqrt{\left(n\sum_0^n X^2 - \left(\sum_0^n X * \sum_0^n Y\right)\right) * \left(n\sum_0^n Y^2 - \left(\sum_0^n X * \sum_0^n Y\right)\right)}} \quad (9)$$

PCC is calculated for each possible pair of accelerometers (i.e. x and y, y and z, and x and z) and for each possible pair of gyroscopes (i.e. roll and pitch, pitch and yaw, and roll and yaw).

A second exemplary quantity comprises the number of significant oscillations in the inertial data. In embodiments of the invention, the quantity may comprise the number of significant oscillations in, for example only in, inertial data relating to the roll of clamp release tool 200. Signal processing unit 303 is configured to determine the number of significant oscillations, by searching the arrays of inertial data for elements for which the difference from the preceding element exceeds a pre-determined threshold. Signal processing unit 303 is further configured to determine the average magnitude of those differences that exceed the threshold.

A third exemplary quantity comprises the skewness of an array. Signal processing unit 303 is configured to calculate the skewness of each of the arrays of inertial data, by use of the following equation:

$$\text{Skewness} = \frac{\text{Mean} - \text{Median}}{\text{Mean} + \text{Median}} \quad (10)$$

A fourth exemplary quantity comprises the kurtosis of an array. Signal processing unit 303 is configured to calculate the kurtosis of each of the arrays of inertial data, by use of the following equation:

$$\text{Kurtosis} = \frac{Q1 - Q3}{P_{95} - P_5} \quad (11)$$

Where:
Q1=first quartile;
Q3=third quartile;
$P_{95}$=95$^{th}$ percentile; and
$P_5$=5$^{th}$ percentile.

A fifth exemplary quantity comprises the rates of change of each array of inertial data. Signal processing unit 303 is configured to calculate the first and second derivatives of each of the arrays of inertial data, by use of the following equations:

$$DevX[j] = \frac{X[j] - X[j-1]}{dt} \quad (12)$$

$$Dev_2X[j] = \frac{DevX[j] - DevX[j-1]}{dt^2} \quad (13)$$

Where:
X=
DevX=first derivative of X; and
Dev2X=second derivative of X;

A sixth exemplary quantity comprises the Shannon-Wiener diversity index. Signal processing unit 303 is configured to calculate a Shannon-Wiener diversity index for each of the arrays of inertial data by use of the following equations:

$$H = -\sum_{i=1}^{S} p_i * \ln(p_i) \quad (14)$$

$$p_i = \frac{S_i}{\sum S_i} \quad (15)$$

Where:
$p_i$=probability of the next entry belonging to state i;
$s_i$=state i;

In embodiments of the invention, the Shannon-Wiener diversity index may be calculated based on, for example based only on, inertial data relating to the pitch of clamp release tool 200.

Further exemplary quantities include the first, second, and third quartiles; the maximum value; the minimum value; the mean value; and the modal value of sorted arrays of the inertial data. The array of inertial data for a sensor can be considered as two sub-arrays, wherein the pre-trigger inertial data comprises a first sub-array and the post-trigger inertial data comprises a second sub-array. The logged inertial data therefore comprises twelve sub-arrays. Signal processing unit 303 is configured to sort the inertial data in each sub-array by magnitude and then determine the first, second, and third quartiles (where the second quartile is the median value); the maximum value; the minimum value; the mean value; and the modal value of each of the sorted sub-arrays. In this exemplary embodiment, inertial measurement unit 301 outputs 12-bit data, and therefore the likelihood of having repeated values in a sub-array is low. Therefore, in calculating the modal value, the inertial data is grouped into 100, preferably equally sized, bins and the modal bin is determined.

Each of the above quantities comprises a factor that may be evaluated in determining whether a detected movement corresponds to a successful release of a POP clamp.

In order to determine whether a detected movement corresponds to a successful release of a POPP clamp, signal processing unit 303 is configured evaluate one or more rules. The one or more rules define the characteristics of a movement deemed to be one corresponding to the clamp moving to the closed position. The one or more rules operate on the basis of a plurality of parameters, which may include one or more of the change in orientation of the clamp release tool, the frequency content of the logged inertial data, and one or more of the above calculated quantities. In embodiments of the invention, signal processing unit 303 is therefore configured to, on the basis of the determined frequency content, determine whether the clamp has moved to the closed position. In alternative embodiments, signal processing unit 303 is configured to determine, on the basis of a count of the number of the one or more rules satisfied, determine a percentage certainty of whether the detected movement corresponds to the clamp moving to the closed position.

The one or more rules are determined by use of a machine learning algorithm. The machine learning algorithm comprises a classification tree configured to, on the basis of the plurality of parameters, classify a detected movement as either being a successful release of a POPP clamp (a "clip") or as not being a successful release of a POPP clamp (a "hit").

Examples of movements that should be classified as a "hit" include unsuccessfully released clamps, an operator dropping the clamp release tool, and an operator knocking the clamp release tool against another object.

The classification tree is configured to operate on the basis of a plurality of weights, which determining the significance of each of the plurality of parameters in classifying a detected movement.

The machine learning algorithm is configured to train the classification tree on the basis of a corpus of training data. The corpus of training data comprises a plurality of entries, wherein each entry corresponds to a historic movement corresponding to either a "clip" (success) or a "hit" (fail). Training the classification tree comprises evaluating the performance of a given plurality of weights in classifying entries from the corpus of training data and, on the basis of that evaluation, generating one or more new candidate pluralities of weights. By repeating the training process, the machine learning algorithm iterates towards a plurality of weights that are optimised for classifying movements as "clips" or "hits".

Single classification trees are very sensitive to the contents of the corpus of training data and are susceptible to generating over-fitted solutions. Therefore, even a small change to the corpus of training data can result in a very different classification tree. The machine learning algorithm is therefore configured to generate a forest of classification trees, wherein each classification tree of the forest is trained using a randomly selected subset of the training data. In this exemplary embodiment, the machine learning algorithm is configured to generate a forest comprising 500 classification trees. The classification decision is then based on simple majority voting of the individual classifications of the trees of the forest.

The machine learning algorithm is further configured to generate the one or more rules based on the forest of trees. The one or more rules are generated by a rule-based learner, for example by use of the simplified Tree Ensemble Learner, which produces one or more rules that approximate the output of the forest of trees. The resulting rules often do not perfectly replicate the output of the forest of tress, and often result in more classification errors, but are significantly less complex and easier to implement.

It has been found that the most significant of the parameters to input to the machine learning algorithm (in that it provides the greatest improvement in classification accuracy) is the DFT sliding window data. The second most significant is the maximum peak in the frequency content, the third is the Shannon-Wiener diversity index, and the fourth is the number of significant oscillations and average change.

Thus, signal processing unit 303 is configured to receive a signal corresponding to a detected movement of the tool head 201; record inertial data that defines the detected movement of the tool head; and, on the basis of the inertial data, determining whether the clamp has moved to the closed position. Signal processing unit 303 operates principally by detecting the characteristic vibrations, which result from a successful clamp release, the presence of the characteristic vibrations being indicative of a successful clamp release.

In the event that signal processing unit 303 determines that a detected movement corresponds to the successful release of a POPP clamp, signal processing unit 303 is configured to light an LED 305, to signal to an operator of the clamp release tool that a successful release has occurred. Signal processing unit 303 is further configured to transmit a signal to a wireless communication module 307 indicating that a "clip" has been detected.

Wireless communication module 307 is configured to transmit to a receiver a signal indicating that a "clip" has been detected. In an automotive production line, this enables the number of clips detected by a given tool at a given location in the production line to be recorded, thus providing traceability data (for example the number of successfully operated clamp closures per vehicle, as performed at given times by a given operator with a particular tool).

In this exemplary embodiment, wireless communication module 307 is configured to transmit a message wirelessly. Alternative embodiments of the invention may instead incorporate a wired communication link. Wireless communication module 307 is further configured to transmit a periodic "heartbeat" signal to the receiver. The "heartbeat" signal includes a "low battery" flag, which indicates a status of a battery of clamp release tool 200. Channel selection 309 comprises one or more switches, the position of which indicates a selected one of a plurality of frequency bands (or channel) over which wireless communication module 307 may communicate with the receiver.

The receiver is configured to receive the signal from wireless communication module 307 indicating that a "clip" has been detected. The receiver comprises a "closed clamp signal received" LED, and is configured to light the "closed clamp signal received" LED in response to receipt of the signal from wireless communication module 307 indicating that a "clip" has been detected. The receiver is configured to communicate with a quality control system, such that the quality control system is updated as clamps are successfully released. The receiver is further configured to receive the "heartbeat" signal from wireless communication module 307. The receiver comprises a "low battery" LED, and is configured to light the "low battery" LED in response to receipt of a "heartbeat" signal in which the "low battery" flag is set. The receiver comprises a channel selection switch, the position of which indicates a selected one of a plurality of frequency bands (or channel) over which the receiver may communicate with wireless communication module 307. The receiver further comprises a "tool present" LED, which is configured to light for as long as a "heartbeat" signal is being regularly received; a "data received" LED; a "receiver OK" LED; and a "power on" LED.

In operation, inertial measurement unit 301 detects movement of tool head 201. When tool head 201 is used to release a POPP clamp, vibrations are induced in tool head 201, which are detected by inertial measurement 301. The vibrations induced by the release of a POPP clamp are of a sufficient magnitude to satisfy the trigger event condition. Signal processing unit 303 therefore records inertial data that defining the movement of tool head 201. Signal processing unit 303 then calculates a plurality of parameters for use in determining whether the inertial data corresponds to a successful clamp release, the plurality of parameters including the change in orientation of clamp release tool 201, the frequency content of the inertial data, and a number of statistical quantities. The plurality of parameters comprise inputs to one or more rules applied by signal processing unit 303, the output of which determine whether the detected movement corresponds to the clamp having moved to the closed position.

Figure 4:
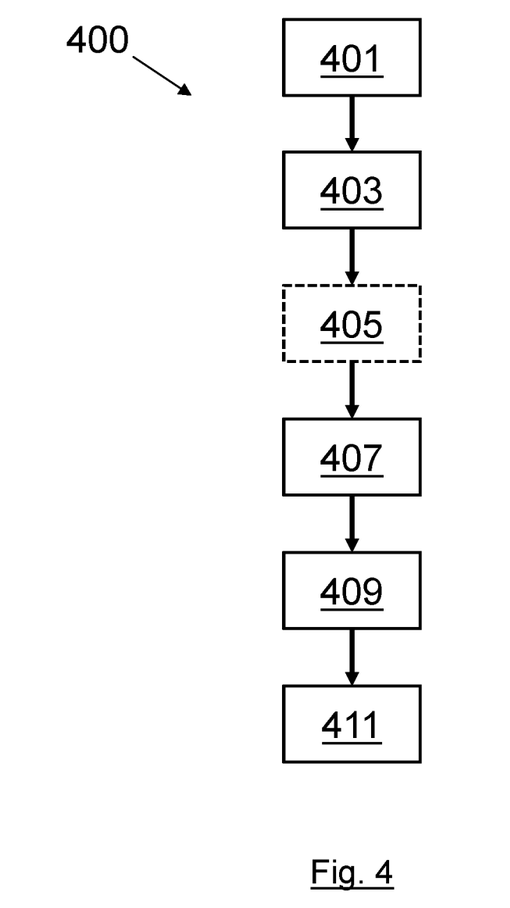
FIG. 4 shows a flow chart illustrating the steps of a method of operating a pre-opened pre-positioned clamp according to a second embodiment of the invention.

FIG. 4 shows a flow chart illustrating the steps of a method 400 of operating a pre-opened pre-positioned clamp, the clamp being operable between an open position and a closed position, according to a second embodiment of the invention.

A first step of the method, represented by box 401, comprises releasing the clamp from the open position using a tool head. The tool head is comprised in a clamp release tool, and the releasing is performed by an operator of the clamp release tool. The operator is typically a human but, in embodiments of the invention, may be a machine.

A second step of the method, represented by box 403, comprises detecting a movement of the tool head resulting from the releasing. The release of the clamp from the open position using the tool head causes the tool head to vibrate. Thus, release of the clamp from the open position is associated with a movement of the tool head, which comprises both the operator's movements of the tool head in order to release the clamp and vibration of the tool head induced by the release of the clamp. The detecting comprises detecting movement of the tool head in respect of all three planes of motion, and rotation of the tool head in respect of its pitch, roll, and yaw.

An optional third step of the method, represented by box 405, comprises, on the basis of the detected movement, determining that a trigger event has occurred. The trigger event comprises detection of four consecutive significant oscillations, wherein a significant oscillation comprises an acceleration of more than 980 ms$^{-2}$.

A fourth step of the method, represented by box 407, recording inertial data that defines the detected movement of the tool head. The recording is performed in response to the detection of the trigger event and comprises recording inertial data from immediately before and immediately after the trigger event. Thus, the recorded inertial data comprises data defining movement preceding the trigger event and data defining movement following the trigger event.

A fifth step of the method, represented by box 409, comprises determining a frequency content of the inertial data. Determining the frequency content comprises a performing a Fourier transform on the recorded inertial data.

A sixth step of the method, represented by box 411, comprises, on the basis of the determined frequency content, determining whether the clamp has moved to the closed position. If the clamp was successfully released, and therefore is now clamping the hose as expected, the frequency content will comprise one or more frequencies that are characteristic of the clamp having successfully moved to the closed position. Determining whether the clamp has moved to the closed position comprises evaluating one or more parameters. The one or more parameters may comprise a change in orientation of the clamp release tool. Determining whether the clamp has moved to the closed position may therefore comprise determining a change in orientation of the clamp release tool.

The one or more parameters may comprise a Pearson's correlation coefficient, a Shannon-Wiener diversity index, a kurtosis, or a skewness of the recorded inertial data. Determining whether the clamp has moved to a closed position comprises applying one or more rules. The one or more rules define the characteristics of a movement deemed to be one that corresponds to the clamp moving to the closed position. The one or more rules are based on the output of a classification tree. More specifically, the one or more rules are based on the output of a majority vote by a plurality of classification trees. The classification trees operate to determine whether the inertial data defines a detected movement that corresponds to a successful release of the clamp. The classification trees perform the classification on the basis of a plurality of weights, the plurality of weights having been previously determined by a machine learning algorithm.

Figure 5:
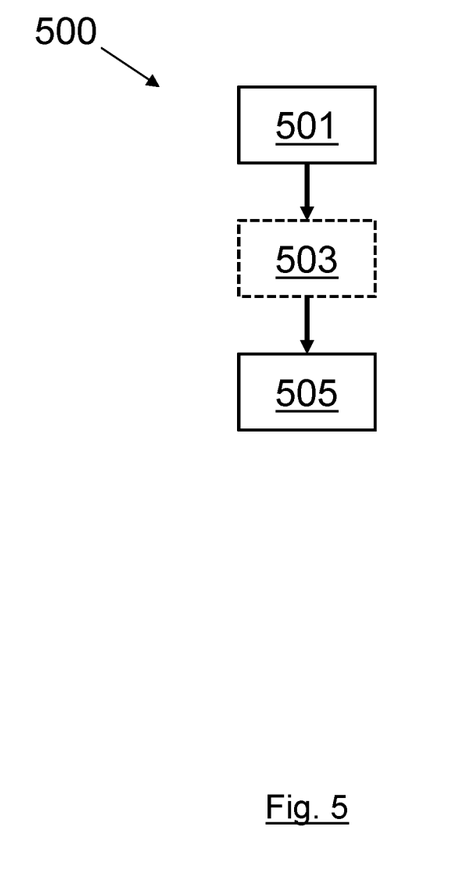
FIG. 5 shows a flow chart illustrating the steps of a method of manufacturing a clamp release tool according to a third embodiment of the invention.

FIG. 5 shows a flow chart illustrating the steps of a method 500 of manufacturing signal processing electronics for a clamp attachment tool according to a third embodiment of the invention.

The tool comprises a tool head arranged to engage with the clamp and inertial measurement electronics arranged to take measurements of a movement of the tool head. The clamp is operable between an open position and a closed position.

A first step of method 500, represented by box 501 comprises providing signal processing electronics, arranged to receive a signal corresponding to the measurements.

An optional second step of method 500, represented by box 503, comprises determining one or more rules for classifying a detected movement as either corresponding to the clamp having moved to the closed position or as not. The one or more rules define the characteristics of a movement deemed to be one corresponding to the clamp moving to the closed position.

Determining the one or more rules comprises operating a machine learning algorithm. Operating a machine learning algorithm comprises train the classification tree on the basis of a corpus of training data. The corpus of training data comprises a plurality of entries, wherein each entry corresponds to a historic movement corresponding to either a "clip" or a "hit". Training the classification tree comprises evaluating the performance of a given plurality of weights in classifying entries from the corpus of training data and, on the basis of that evaluation, generating one or more new candidate pluralities of weights. By repeating the training process, the machine learning algorithm iterates towards a plurality of weights that are optimised for classifying movements as "clips" or "hits".

Single classification trees are very sensitive to the contents of the corpus of training data and are susceptible to generating over-fitted solutions. Therefore, even a small change to the corpus of training data can result in a very different classification tree. Operating a machine learning algorithm therefore comprises generating a forest of classification trees, wherein each classification tree of the forest is trained using a randomly selected subset of the training data. In this exemplary embodiment, operating a machine learning algorithm comprises generating a forest comprising 500 classification trees. The classification decision is then based on simple majority voting of the individual classifications of the trees of the forest.

Operating a machine learning algorithm comprises further comprises generating the one or more rules based on the forest of trees. The one or more rules are generated by a rule-based learner, for example by use of the simplified Tree Ensemble Learner, which produces one or more rules that approximate the output of the forest of trees. The resulting rules often do not perfectly replicate the output of the forest of tress, and often result in more classification errors, but are significantly less complex and easier to implement.

A third step of method 500, represented by box 505, comprises programming the signal processing electronics to record data relating to the measurements, determine a frequency content of the data and, on the basis of the determined frequency content, determine whether the clamp has moved to the closed position. Determining whether the clamp has moved to the closed position comprises applying the one or more rules.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

In alternative embodiments of the invention, some or all of the functionality provided by signal processing unit 303 in the first embodiment is instead provided by the receiver. In such embodiments, wireless communication module 307 is configured to transmit inertial data from inertial measurement unit 301 to the receiver, which subsequently determines whether a detected movement constitutes a "clip" or a "hit".

In alternative embodiments of the invention, signal processing electronics 303 is implemented one or more of a processor, a field programmable gate array, a programmable logic device, and discrete electronic components. In alternative embodiments of the invention, signal processing electronics 303 is implemented wholly or in part as a software module.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of operating a pre-opened pre-positioned clamp, the clamp being operable between an open and a closed position, and the method comprising:
    releasing the clamp from the open position using a tool head;
    making measurements using an accelerometer and a gyroscope of a movement of the tool head resulting from the releasing;
    recording data relating to the measurements;
    determining a frequency content of the data; and
    on the basis of the determined frequency content, determining whether the clamp has moved to the closed position.

2. The method of claim 1, wherein making measurements of a movement comprises measuring movement in respect of all three planes of motion, and rotation in respect of pitch, roll, and yaw.

3. The method of claim 1, wherein the movement comprises vibration.

4. The method of claim 1, wherein the frequency content comprises content concerning one or more frequencies that are characteristic of the clamp having moved to the closed position.

5. The method of claim 1, further comprising, on the basis of the measured movement, determining that a trigger event has occurred.

6. The method of claim 5, wherein the determining that a trigger event has occurred comprises detection of a significant oscillation, wherein a significant oscillation comprises at least one of an acceleration of more than a threshold, the threshold being greater than 500 $ms^{-2}$, and a rate of change of acceleration of more than a threshold, the threshold being greater than 500 $ms^{-3}$.

7. The method of claim 6, wherein the trigger event comprises detection of at least four consecutive significant oscillations.

8. The method of claim 5, wherein the recorded data comprises data defining movement preceding the trigger event and data defining movement following the trigger event.

9. The method of claim 1, wherein determining whether the clamp has moved to a closed position comprises determining a change in orientation of the clamp release tool.

10. The method of claim 1, wherein determining whether the clamp has moved to a closed position comprises calculating a plurality of parameters of, or derived from, the frequency content of the data and using those parameters to evaluate whether the clamp has moved to a closed position, the plurality of parameters comprising at least one of the following:
    a correlation coefficient,
    a diversity index,
    a kurtosis measure,
    a skewness measure,
    the magnitude of the maximum peak in the frequency domain,
    the frequency of the maximum peak in the frequency domain, and
    the magnitude and/or frequency of at least one other frequency peak.

11. The method of claim 1, wherein determining whether the clamp has moved to a closed position comprises calculating a plurality of parameters of, or derived from, the recorded data and using those parameters to evaluate whether the clamp has moved to a closed position, the plurality of parameters comprising two or more different parameters from a group consisting of:
    a correlation coefficient,
    a diversity index,
    a count of significant oscillations,
    an average rate of change of the significant oscillations,
    a rate of change of acceleration,
    a rate of change of angular velocity,
    a kurtosis measure,
    a skewness measure,
    a maximum value of one or more of acceleration, angular velocity, rate of change of acceleration, rate of change of angular velocity,
    a minimum value of one or more of acceleration, angular velocity, rate of change of acceleration, rate of change of angular velocity,
    an average value of one or more of acceleration, angular velocity, rate of change of acceleration, rate of change of angular velocity, and
    a first quartile and/or a third quartile value of one or more of acceleration, angular velocity, rate of change of acceleration, rate of change of angular velocity.

12. The method of claim 1, wherein determining whether the clamp has moved to a closed position comprises applying one or more rules, the one or more rules defining the characteristics of a movement deemed to be one corresponding to the clamp moving to the closed position.

13. The method of claim 1, wherein determining whether the clamp has moved to the closed position comprises evaluating the output of a sliding window algorithm, the sliding window algorithm comprising calculating a ratio of an amplitude of a first frequency band to an amplitude of a second frequency band.

14. The method of claim 13, wherein the sliding window algorithm comprises calculating at least ten ratios.

15. The method of claim 1, wherein determining whether the clamp has moved to the closed position comprises a positive detection of a movement corresponding to the clamp moving to the closed position.

16. A clamp attachment tool for operating a pre-opened pre-positioned clamp, the clamp being operable between an open position and a closed position, and the tool comprising:
- a tool head for releasing a clamp from the open position;
- inertial measurement electronics comprising an accelerometer and a gyroscope arranged to make measurements of a movement of the tool head; and
- signal processing electronics, configured to record data relating to the measurements, determine a frequency content of the data, and, on the basis of the determined frequency content, determine whether the clamp has moved to the closed position.

17. The clamp attachment tool according to claim 16, wherein the clamp is suitable for clamping a hose to a spigot.

18. The clamp attachment tool of claim 17, wherein:
- the clamp in the open position is held at an expanded diameter, greater than an external diameter of the hose; and
- the clamp in the closed position is positioned around the hose at substantially the same diameter as the external diameter of the hose; and
- the clamp is resiliently deformable, such that the clamp in the closed position exerts a compressive force on the hose, clamping the hose to the spigot.

19. A method of manufacturing signal processing electronics for a clamp attachment tool, the tool being suitable for operating a pre-opened pre-positioned clamp, the tool comprising a tool head arranged to engage with the clamp and inertial measurement electronics comprising an accelerometer and a gyroscope arranged to take measurements of a movement of the tool head, the clamp being operable between an open position and a closed position, and the method comprising:
- providing signal processing electronics, arranged to receive a signal corresponding to the measurements;
- programming the signal processing electronics to record data relating to the measurements, determine a frequency content of the data and, on the basis of the determined frequency content, determine whether the clamp has moved to the closed position.

20. The method of claim 19, further comprising operating a machine learning algorithm to determined one or more rules for classifying a detected movement as either corresponding to the clamp having moved to the closed position or as not, the one or more rules defining the characteristics of a movement deemed to be one corresponding to the clamp moving to the closed position; and wherein determining whether the clamp has moved to the closed position comprises applying the one or more rules.

* * * * *